United States Patent [19]

Osborne et al.

[11] 4,383,652
[45] May 17, 1983

[54] SHREDBAR APPARATUS

[75] Inventors: Donald L. Osborne, Quarryville; Joe E. Shriver; John R. McClure, both of New Holland, all of Pa.

[73] Assignee: Sperry Corporation, New Holland, Pa.

[21] Appl. No.: 255,412

[22] Filed: Apr. 20, 1981

[51] Int. Cl.³ .............................................. B02C 18/06
[52] U.S. Cl. .................................. 241/88.4; 241/89.1; 241/89.2; 241/89.3; 241/101.7; 241/222; 241/241
[58] Field of Search ................... 241/88.4, 89.1, 89.2, 241/88.1, 89.3, 220, 221, 222, 101.7, 285 R, 285 A, 158, 285 B, 73, 88, 189 R, 239, 241, 300.1, 291

[56] References Cited

U.S. PATENT DOCUMENTS

| 3,090,568 | 5/1963 | Wetmore | 241/73 |
| 3,566,943 | 3/1971 | Witt | 241/88 |
| 3,752,411 | 8/1973 | Blanshine . | |
| 3,829,030 | 8/1974 | Wallenfang et al. | 241/73 X |
| 3,963,183 | 6/1976 | Paulsen | 241/88.4 |

Primary Examiner—Mark Rosenbaum
Attorney, Agent, or Firm—Frank A. Seemar; Larry W. Miller; Darrell F. Marquette

[57] ABSTRACT

A shredbar is used with a forage harvester cutterhead mainly for cracking kernels of corn. The problem of premature wear of the shredbar is avoided by providing a shredbar apparatus with a reversible surface for abrading crop material. The shredbar apparatus includes pivotal members to increase flexibility for quick installation and removal.

6 Claims, 8 Drawing Figures

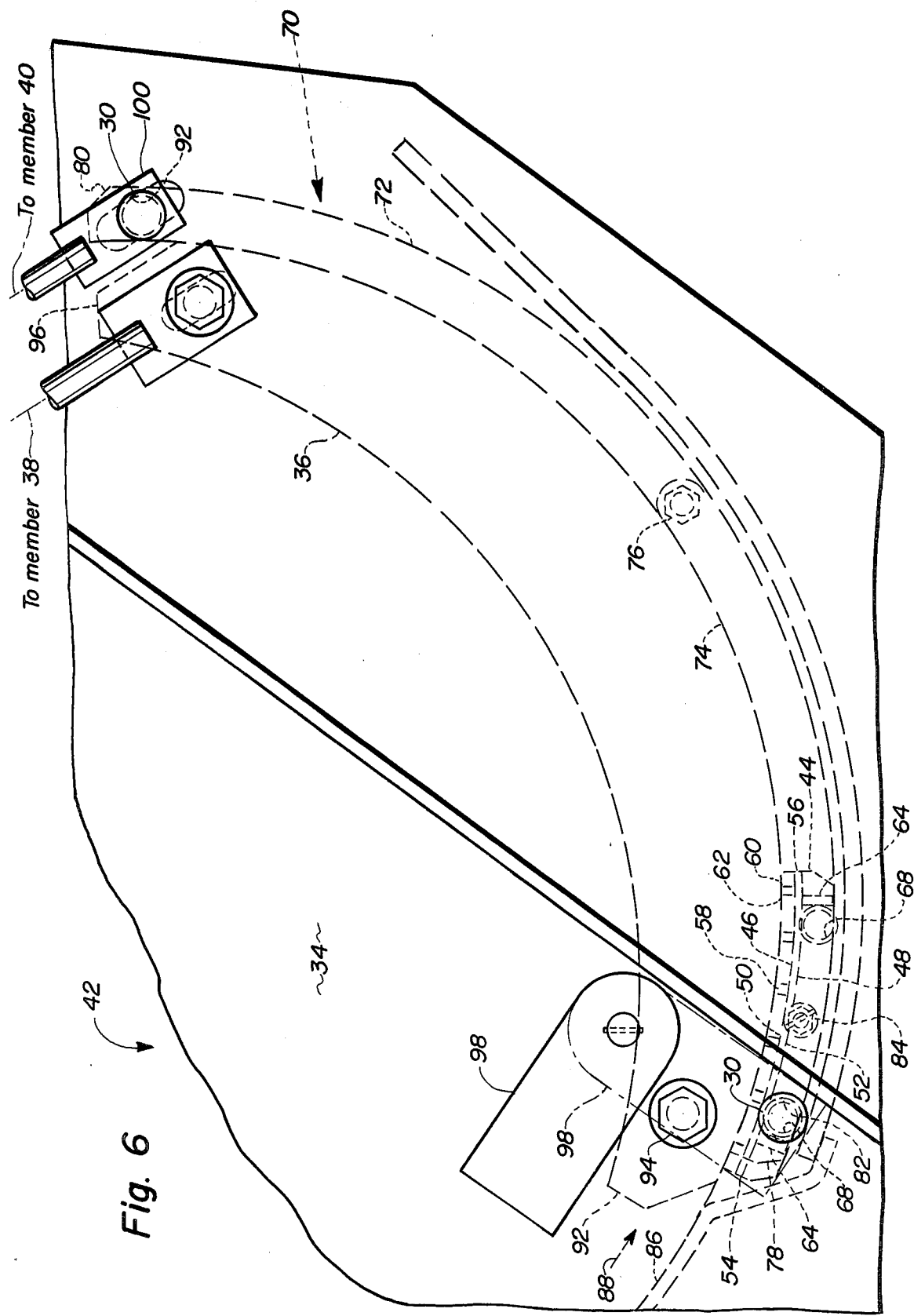

Fig. 7
Fig. 8
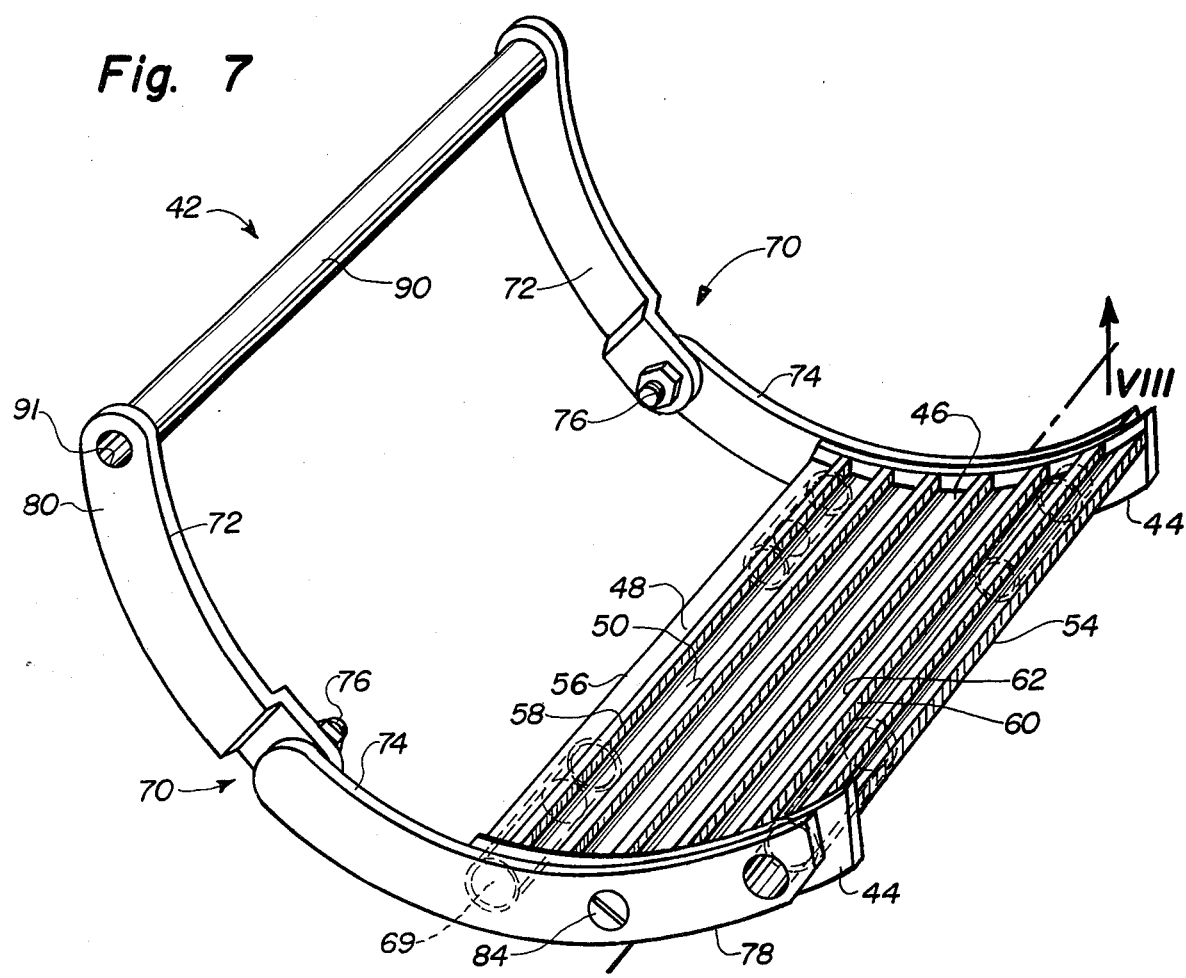
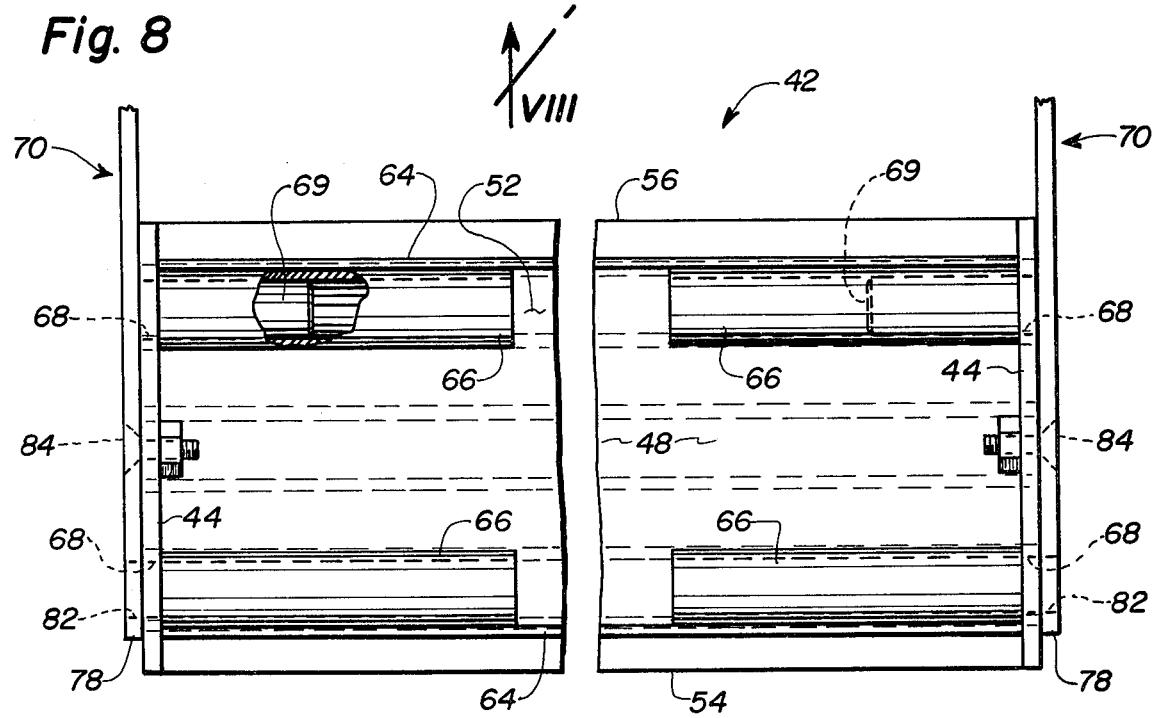

SHREDBAR APPARATUS

BACKGROUND OF THE INVENTION

This invention relates generally to solid material comminution or disintegration, and more particularly to apparatus or material which is flowing circumferentially or tangentially with a rotary striking member.

Recutter screens are often used in combination with rotary cutterhead knives in forage harvesters. These screens are available with various sized slots and holes formed therein for producing a more uniform cut of crop material. When it is desired to crack corn kernels, a shredbar is used instead of a recutter screen for cracking corn kernels. The shredbar has an abrading surface which wears down to an ineffective level, and therefore, must be replaced. Shredbar wear is a limitation and occurs because impact between the crop material and the shredbar is more intense than the impact between the crop material and the screens. As a result, shredbars must be more rigid than their counterpart screens which are somewhat flexible. Thus, another limitation is that rigid shredbars are more difficult to install and remove then the flexible screens.

The foregoing illustrates limitations of the known prior art. Thus, it is apparent that it would be advantageous to provide an alternative directed to overcoming one or more of the limitations as set forth above.

Accordingly, a suitable alternative is to provide a reversible shredbar apparatus which extends wear life and which is easily installed and removed.

SUMMARY OF THE INVENTION

In one aspect of the present invention, this is accomplished by providing a reversible shredbar apparatus having a face plate with crop material abrading ribs and is supported by a pair of arcuate members. The face plate is releasably connected for being reversed between the arcuate members. Each of the arcuate members is divided into arcuate sections which are pivotally interconnected.

The foregoing and other aspects will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

In the drawings:

FIG. 6 is a partial side view illustrating an embodiment of the shredbar apparatus of this invention;

FIG. 7 is an isometric view of an embodiment of the shredbar apparatus of this invention; and FIG. 8 is a partial bottom plan view of the face plate as viewed from line VIII—VIII of FIG. 7.

DESCRIPTION OF THE PREFERRED EMBODIMENT

Figure 1:
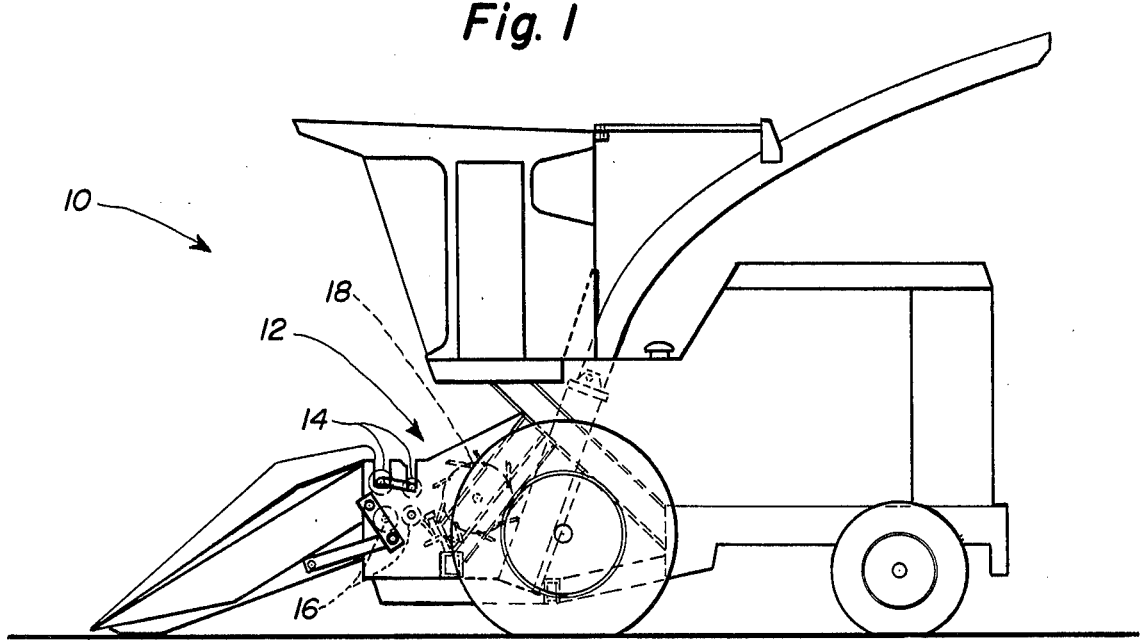
FIG. 1 is a side view of an embodiment of an exemplary harvesting machine.
Figure 2:
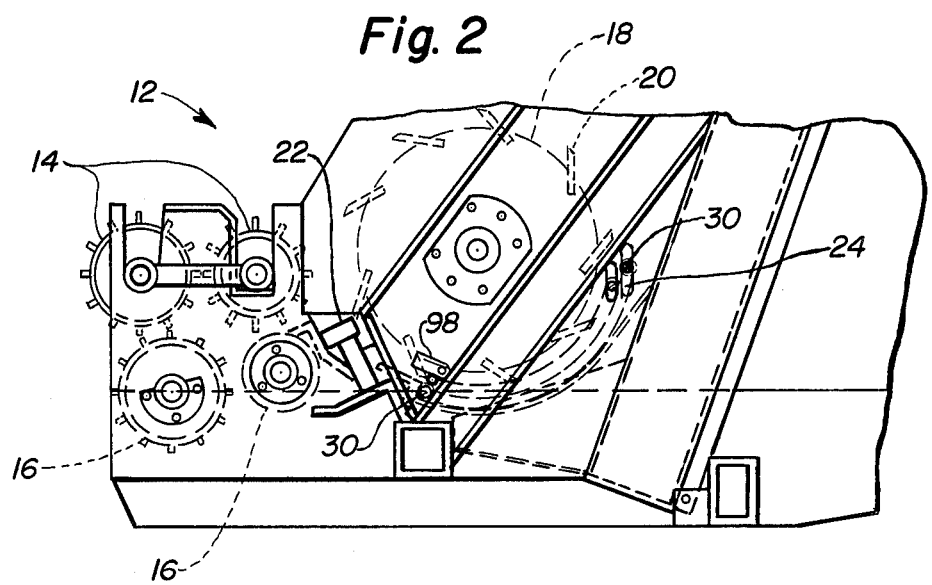
FIG. 2 is a partial side view of an embodiment of an exemplary combination of a cutterhead portion of a harvesting machine.

FIG. 1 illustrates a well known self-propelled forage harvester 10 of the type with which the present invention is used. Also, the present invention can be used with a conventional pull-type forage harvester (not shown). Harvester 10 includes a known cutterhead assembly group 12 which generally comprises a pair of upper 14 and a pair of lower 16 feed rolls which cooperate with a rotary knife 18. In FIG. 2, the cutterhead assembly group 12 is shown in more detail and it can be seen that knife 18 comprises a plurality of blades 20 which rotate in cutting cooperation with a shearbar 22. In this manner, crop material which is fed to knife 18 by the feed rolls 14,16, is cut by the cutting action of the blades 20 and shearbar 22.

Figure 4:
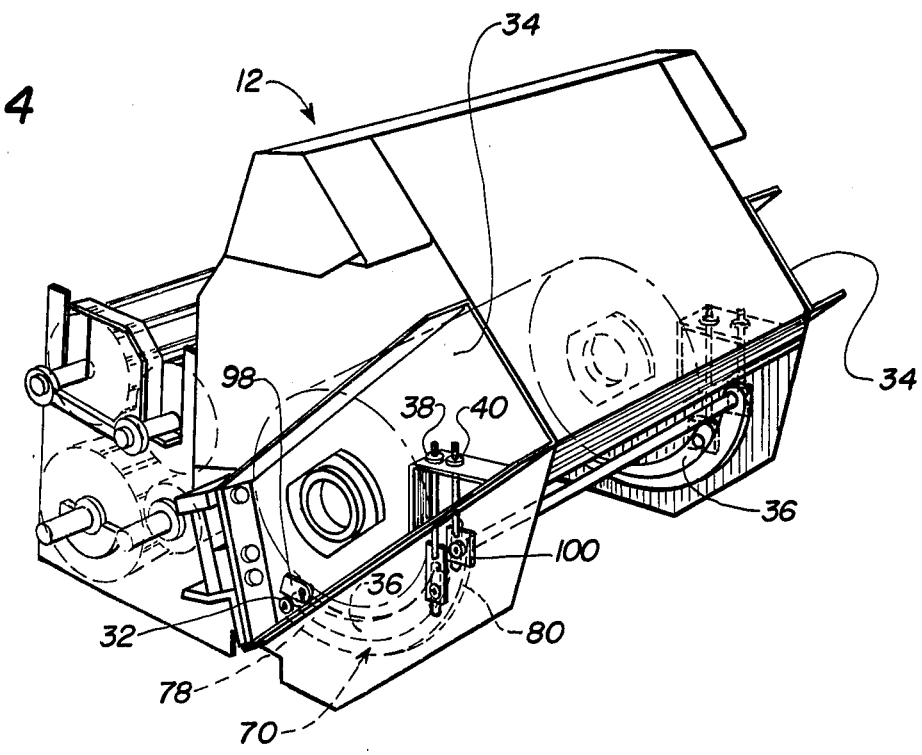
FIG. 4 is an isometric view of an embodiment of a cutterhead portion of a harvesting machine.
Figure 5:
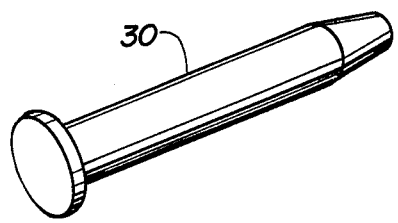
FIG. 5 is an isometric view of an embodiment of a pin used to secure recutter screens and the shredbar of this invention in proximity with a rotary knife.
Figure 3:
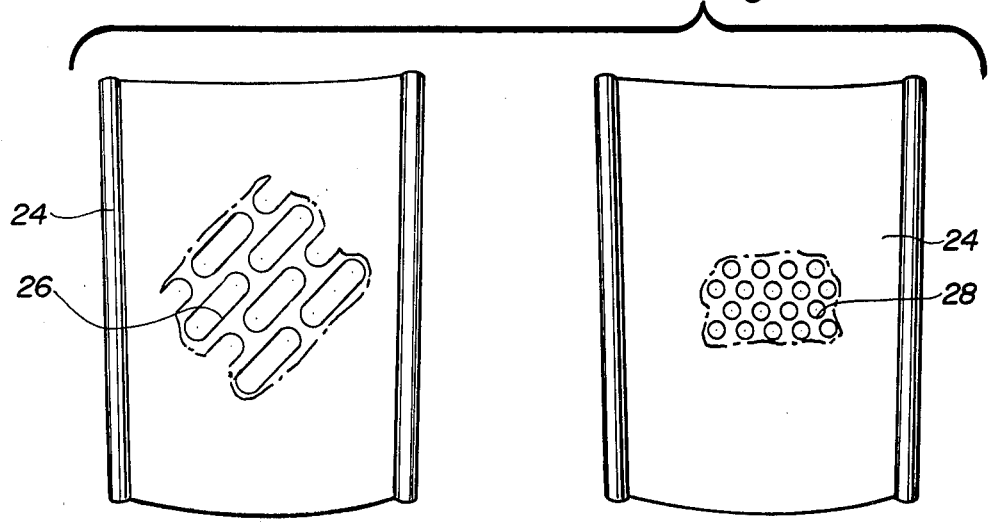
FIG. 3 is an isometric view of an embodiment of some exemplary recutter screens.

A curved recutting screen 24 (FIGS. 2 and 3) may include a plurality of either slots 26 or holes 28 formed therein for producing a more uniform cut of crop material. Screens 24 are substantially flexible and are placed adjacent rotary knife 18 and secured (see also FIG. 4) by a plurality of pins 30 inserted through holes 32 formed in a pair of opposed frame plates 34 of cutterhead assembly group 12. Screens 24 are positioned to abut a pair of supportive crescent plates 36, generally of the same curved configuration of screens 24. Each crescent plate 36 is pivotally attached to a frame plate 34 and is pivotally adjusted to a desired proximity with knife 18 by manipulation of adjustment member 38. Similarly, screens 24 are pivotally attached to a frame plate 34 and are pivotally adjusted into engagement with crescent plates 36 by manipulation of adjustment member 40. The present invention, described more fully hereinafter, includes a shredbar apparatus 42 for use in place of a recutter screen 24, when it is desired to crack kernels of corn. The shredbar apparatus 42 is positioned the same as the screens 24, that is, adjacent blades 20, but shredbar 42 is for the specific use of cracking corn rather than just uniformly cutting crop material as is accomplished by screens 24.

FIGS. 6, 7 and 8 should be referred to along with the following detailed description of the preferred embodiment which illustrates shredbar apparatus 42 having a pair of spaced steel endplates 44 and an upper arcuate surface 46. A steel face plate 48 is preferably welded, at its opposite ends, to endplates 44. Face plate 48 is generally arcuate similar to surface 46 to form an upper concave face 50 and a lower convex face 52. Opposite ends 54,56 are angled slightly downwardly for guiding crop material between blades 20 and upper concave face 50, and for reinforcing face plate 48. A plurality of crop material abrading steel ribs 58, are preferably welded to face 50 and extend between plates 44. Ribs 58 are of a rectangular cross-section so as to form edges 60,62.

Convex face 52 includes at least one, but preferably two, steel rectangular reinforcing ribs 64 welded to face 52 and extending between plates 44. Ribs 64 are preferably adjacent angled ends 54,56.

A first pair of pin receiving tubes 66 are of steel and are welded to convex face 52 in abutment with one of the plates 44 and a second pair of tubes 66 are similarly welded to convex face 52 in abutment with the other of end plates 44. One of the tubes 66 of each pair is adjacent end 54 and the other of the tubes 66 is adjacent end 56. Each end plate 44 includes apertures 68 formed therein which are aligned with the tubes 66. Apertures 68 and tubes 66 are of a size sufficient for receiving pins 30.

A pair of arcuate members 70 are formed of steel and are divided into two sections 72,74. Each section is pivotally interconnected at bolt-nut assembly 76 to form a pivotable joint between a first end 78 and a second end 80 of each arcuate member 70. The arcuate members 70 are of a curved configuration substantially similar to surface 46 and face plate 48. In this manner, arcuate members are flexible for facilitating installation and removal.

First end 78 of each arcuate member 70 includes an aperture 82 formed therein of a size sufficient to accommodate pins 30 and located for simultaneous alignment with one of the apertures 68 in each endplate 44 when endplates 44 are releasably attached to arcuate members 70 adjacent first end 78 by a bolt-nut assembly 84. Assembly 84 is located such that aperture 82 will simultaneously align with the apertures 68 adjacent end 54 or, in the alternative, with the apertures 68 adjacent end 56 when end plates 44 are attached to first end 78 of arcuate member 70. In this manner, face plate 48 is reversible for exposing either of the edges 60,62 to the oncoming crop material moving along the circumferential path 86 of travel of knife blades 20 in the direction of rotation indicated at 88. A pin 69, FIGS. 7 and 8, is welded to each section 74 of member 70. The pins are of a size sufficient to fit into tubes 66 and cooperate with bolt-nut assembly 84 to stabilize face plate 48.

Second end 80 of each arcuate member 70 includes a steel tubular member 90 interconnected therebetween by welding in alignment with an aperture 81 in each second end 80. Apertures 91 and tube 80 are of a size sufficient for receiving pins 30.

An exemplary crescent plate 36 is pivotally attached at a first end 92 to a frame plate 34 at bolt 94, FIG. 6, such that manipulation of adjustment member 38, attached to a second end 96 of crescent plate 36, pivots crescent plate 36 to a desired proximity with circumferential path 86. First end 78 of arcuate member 70 is pivotally attached to frame plate 34 at pin 30 inserted into apertures 23,82,68 and into tubes 66. Second end 80 of arcuate member 70 is connected to adjustment member 40 such that manipulation of adjustment member 40 pivots arcuate member 70 into engagement with crescent plates 36. Pin 30, at first end 78 of arcuate member 70, is retained in place by a pivotable latch 98, see FIG. 4, which pivots to a position which limits pin 30 from being removed from frame plate 34. Another pin 30 at second end 80 of arcuate member 70 is engaged by clamp 100 of adjustment member 40 which functions to maintain pin 30 in position.

With the parts assembled as set forth above, first end 78 of shredbar apparatus 42 is inserted adjacent crescent plates 36 between frame plates 34 of cutterhead assembly group 12. Pins 30 are inserted through apertures 32,82,68 and into tubes 66. Latch 98 is pivoted into position to limit movement of pins 30. Other pins 30 are inserted through apertures 91 and into tube 90 at second end 80 of shredbar apparatus 42. Clamp 100 is engaged with pins 30 at second end 80 and adjustment member 40 is manipulated to urge arcuate members 70 into engagement with crescent plates 36. Both the crescent plates 36 and the shredbar apparatus 42 can be positionally readjusted by manipulation of adjustment members 38,40, respectively.

When it is desired to reverse face plate 48 so as to direct either of edges 60,62 toward the oncoming crop material moving in the direction of rotation 88 of blades 20, bolt-nut assembly 84 can be easily released and reattached to first end 78 with appropriate well known tools. Thus, the wear life of apparatus 42 is increased. Insertion and/or removal of apparatus 42 which cutterhead assembly group 12 is facilitated due to the flexibility, through the pivotal interconnection of sections 72,74 at bolt-nut assembly 76, of arcuate members 70.

The foregoing has described a reversible shredbar apparatus which extends wear life and which is easily installed and removed.

It is anticipated that aspects of the present invention, other than those specifically defined in the appended claims, can be obtained from the foregoing description and the drawings.

Having thus described the invention, what is claimed is:

1. A reversible shredbar apparatus comprising:
   a pair of spaced endplates;
   a face plate interconnecting said end plates;
   a plurality of crop material abrading ribs on a first face of said face plate, said abrading ribs extending from a first to a second one of said end plates;
   a first pair of pin receiving tubes connected to a second face of said face plate and abutting said first end plate, said first end plate having a pair of apertures formed therein in alignment with said first pair of tubes;
   a second pair of pin receiving tubes connected to said second face and abutting said second end plate, said second end plate having a pair of apertures formed therein in alignment with said second pair of tubes;
   a pair of arcuate members each having a first and a second end, said end plates connected between said arcuate members adjacent said first end, each of said arcuate members having an aperture therein adjacent said first end;
   means for releasably connecting either of said first and second end plates to said first end of either of said arcuate members for aligning said aperture in each of said arcuate members with one of said apertures of said pairs formed in said end plate;
   a tubular member fixedly interconnected between a second end of each arcuate member, each of said arcuate members second ends having an aperture formed therein in alignment with said tubular member; and
   each of said arcuate members is divided into two arcuate sections, each section being pivotally interconnected between said first and second ends.

2. The apparatus of claim 1 including:
   a cutterhead housing of a forage harvester, said housing having first and second spaced frame plates;
   first and second crescent members attached to said first and second frame plates, respectively; and
   said first and second arcuate members are attached to said first and second frame plates, respectively.

3. The apparatus of claim 2 wherein each of said first and second crescent members is pivotally and adjustably attached to said first and second frame plates, respectively.

4. The apparatus of claim 2 wherein each of said arcuate members is pivotally and adjustably connected to said frame plates.

5. The apparatus of claim 2 wherein each of said crescent members is pivotally and adjustably connected to said frame plates, each of said arcuate members is pivotally and adjustably connected to said frame plates, and said first and second arcuate members are in abutting engagement with said first and second crescent members, respectively.

6. The apparatus of claim 1 wherein said second face of said face plate includes at least one reinforcing rib extending from said first to said second end plates.

* * * * *